US009702780B2

(12) United States Patent
Douglas (10) Patent No.: US 9,702,780 B2
(45) Date of Patent: Jul. 11, 2017

(54) METHOD AND APPARATUS FOR DETECTION OF WHEEL ASSEMBLY SLIPPAGE ON A VEHICLE WHEEL BALANCER

(71) Applicant: Hunter Engineering Company, St. Louis, MO (US)

(72) Inventor: Michael W. Douglas, St. Charles, MO (US)

(73) Assignee: Hunter Engineering Company, St. Louis, MO (US)

( * ) Notice: Subject to any disclaimer, the term of this patent is extended or adjusted under 35 U.S.C. 154(b) by 711 days.

(21) Appl. No.: 14/096,990

(22) Filed: Dec. 4, 2013

(65) Prior Publication Data
US 2014/0165721 A1 Jun. 19, 2014

Related U.S. Application Data (60) Provisional application No. 61/738,270, filed on Dec. 17, 2012, provisional application No. 61/758,004, filed on Jan. 29, 2013.

(51) Int. Cl.
G01M 1/16 (2006.01)
G01M 1/28 (2006.01)
G01M 1/32 (2006.01)

(52) U.S. Cl.
CPC .............. G01M 1/28 (2013.01); G01M 1/326 (2013.01)

(58) Field of Classification Search
CPC .................................. G01M 1/28; G01M 1/326
See application file for complete search history.

(56) References Cited

U.S. PATENT DOCUMENTS

| 5,144,996 | A | * | 9/1992 | Kinuhata | B29D 30/68 157/13 |
| 5,479,821 | A | * | 1/1996 | Goebel | G01M 1/28 73/457 |
| 6,336,364 | B1 | | 1/2002 | Parker et al. | |
| 6,393,911 | B2 | * | 5/2002 | Colarelli, III | G01M 1/225 73/462 |
| 6,405,591 | B1 | | 6/2002 | Colarelli, III et al. | |

(Continued)

FOREIGN PATENT DOCUMENTS

JP 2006062638 A * 3/2006 .............. G01M 1/02

Primary Examiner — Harshad R Patel
Assistant Examiner — Samir M Shah
(74) Attorney, Agent, or Firm — Polster, Lieder, Woodruff & Lucchesi, LC (57) ABSTRACT

A vehicle wheel balancer system having a processing system and a spindle shaft upon which a vehicle wheel assembly is mounted for measurement of imbalance characteristics and forces. The processing system is configured with software instructions to evaluate the remaining imbalance present in a vehicle wheel assembly following the application of imbalance correction weights, and to determine if the remaining imbalance is the result of the vehicle wheel assembly having deviated from an expected rotational position during the time between the measurement of the imbalance and the application of the imbalance correction weights. In the event of such a deviation, the processing system is further configured to provide the operator with a suitable warning to evaluate and correct the mounting of the vehicle wheel assembly before proceeding to rebalance or re-measure the vehicle wheel assembly.

11 Claims, 6 Drawing Sheets (56) References Cited

U.S. PATENT DOCUMENTS

| | | | |
|---|---|---|---|
| 6,422,074 B1 | 7/2002 | Colarelli, III et al. | |
| 6,435,027 B1 | 8/2002 | Colarelli, III et al. | |
| 6,532,673 B2* | 3/2003 | Jahn | G01B 11/275 33/193 |
| 6,715,351 B1* | 4/2004 | Feero | G01M 1/02 73/462 |
| 6,807,471 B2* | 10/2004 | Fujimori | B66F 9/07568 180/443 |
| 6,894,771 B1 | 5/2005 | Dorrance et al. | |
| 6,952,964 B2* | 10/2005 | Gerdes | G01M 1/02 73/459 |
| 7,320,248 B2 | 1/2008 | Douglas | |
| 7,523,655 B2* | 4/2009 | Braghiroli | G01B 11/2755 73/146 |
| 7,658,108 B2 | 2/2010 | Douglas | |
| 7,703,568 B2* | 4/2010 | Ishii | A63C 17/12 180/218 |
| 8,783,326 B1* | 7/2014 | Vaninger | B60C 25/0551 157/1.17 |
| 2003/0028306 A1* | 2/2003 | Fujimori | B66F 9/07568 701/41 |
| 2004/0172181 A1* | 9/2004 | Lu | B60C 23/061 701/36 |
| 2007/0068259 A1* | 3/2007 | Douglas | G01M 1/326 73/662 |
| 2007/0144657 A1* | 6/2007 | Flament | B29D 30/0662 156/110.1 |
| 2009/0178473 A1* | 7/2009 | Hoshi | G01M 15/05 73/114.26 |
| 2013/0204494 A1* | 8/2013 | Herschel | B62D 5/001 701/42 |

* cited by examiner

METHOD AND APPARATUS FOR DETECTION OF WHEEL ASSEMBLY SLIPPAGE ON A VEHICLE WHEEL BALANCER

CROSS-REFERENCE TO RELATED APPLICATIONS

The present application is related to, and claims priority from, U.S. Provisional Patent Application Ser. No. 61/738,270 filed on Dec. 17, 2012, and is further related to and claims priority from, U.S. Provisional Patent Application Ser. No. 61/758,004 filed on Jan. 29, 2013, both of which are herein incorporated by reference.

STATEMENT REGARDING FEDERALLY SPONSORED RESEARCH

Not Applicable.

BACKGROUND OF THE INVENTION

The present invention is related to vehicle wheel balancer systems having a spindle shaft upon which a vehicle wheel assembly undergoing an imbalance measurement and correction procedure is mounted, and in particular, to a method for detecting and identifying deviations of the actual rotational position of the vehicle wheel assembly mounted on the spindle shaft from an expected rotational position of the vehicle wheel assembly after an imbalance measurement.

Vehicle wheel assemblies, consisting of a tire mounted to a wheel rim, generally have at least a small amount of non-uniformity about an axis of rotation which is experienced as vibration when the wheel assembly is installed on a vehicle and driven at road speeds. These non-uniformities may be the result of manufacturing defects in either the rim or tire, damage to the rim or tire, or spring-rate variations about the circumference of the tire. A spring rate variation relates to a tire's stiffness at various points about the circumference of the tire. As a stiff point rotates into contact with a road surface, the tire reacts differently when compared with the reaction resulting from the contact of a softer point with the road surface. This produces a measurable force variation at a rotational speed of the tire, leading to a first harmonic vibration.

Figure 1:
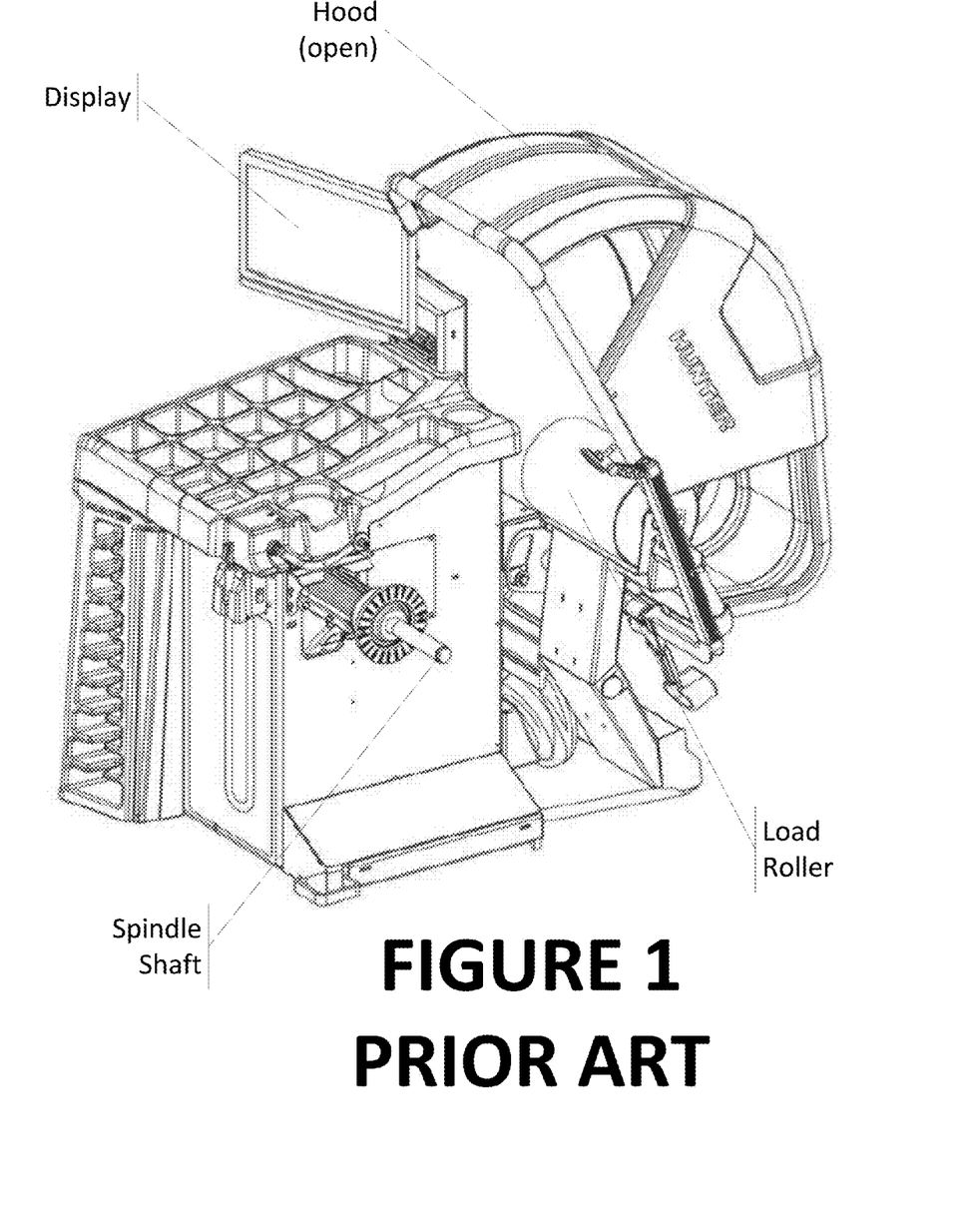
FIG. 1 is a perspective illustration of a prior art vehicle wheel balancer system including a load roller for applying radial forces to a wheel assembly mounted on a spindle shaft.

Vehicle wheel balancer systems, such as shown in FIG. 1, are configured to measure the imbalance (static and dynamic) of a vehicle wheel assembly by mounting the vehicle wheel assembly on a spindle shaft, rotationally driving the spindle shaft and mounted vehicle wheel assembly, and measuring the resulting vibrations or forces through suitably placed transducer elements. By processing the signals from the transducer elements, together with rotational position signals associated with the spindle shaft, a balancer processing system can identify the imbalance present in the vehicle wheel assembly, and direct an operator to apply imbalance correction weights at specific rotational and axial positions about the vehicle wheel assembly. In order to assist the operator in this task, a vehicle wheel balancer system may be configured to rotationally drive the vehicle wheel assembly to position the application site for an imbalance correction weight at a predetermined rotational position.

In order to measure force variations in a vehicle wheel assembly mounted to the spindle shaft of a vehicle wheel balancer, the vehicle wheel balancer system must be equipped with additional instrumentation. For example, as shown in U.S. Pat. Nos. 6,422,074, 6,435,027, 6,405,591, and 6,336,364, each of which is herein incorporated by reference, an instrumented drum or load roller is movable to engage with an outer circumferential surface of the inflated tire as the vehicle wheel assembly is rotationally driven on the spindle shaft. Signals representative of the forces exerted on the instrumented drum or roller by the rotating vehicle wheel are processed by the balancer processing system, together with the rotational position signals associated with the spindle shaft, to identify the spring rate variations about the circumference of the tire.

Each of these measurement procedures requires that the vehicle wheel assembly remain in a fixed position relative to the spindle shaft upon which it is mounted, such that sensors monitoring the rotation of the spindle shaft can accurately identify the corresponding rotational position of the vehicle wheel assembly. Rotational mounting slippage of the vehicle wheel assembly about the rotational axis of the spindle shaft during or after a measurement procedure is generally difficult to detect, and may result in the vehicle wheel balancer processing system directing an operator to apply an imbalance correction weight at an incorrect rotational position on the vehicle wheel assembly, as the wheel assembly is not rotationally positioned where expected relative to the balancer spindle shaft. This slippage may result from an operator's failure to properly secure the vehicle wheel assembly to the spindle, or in response to a sudden acceleration or deceleration of the vehicle wheel assembly during rotation on the spindle shaft, such as may occur during engagement of the vehicle wheel assembly with an instrumented drum or roller.

A similar, albeit rare, source of error may be introduced if the spindle shaft itself rotationally slips relative to a rotational position sensor of the vehicle wheel balancer system which is monitoring the shaft rotation. Under these circumstances, the vehicle wheel balancer processing system will again direct the operator to apply an imbalance correction weight at an incorrect rotational position of the vehicle wheel assembly, as the processing system is unable to detect the deviation of the spindle shaft actual rotational position from the rotational position reported by the position sensor.

Application of an imbalance correction weight at an incorrect rotational position on the vehicle wheel assembly will fail to correct the measured imbalance of the vehicle wheel assembly, which will result in the vehicle wheel assembly failing a follow-up check spin. While current vehicle wheel balancer systems can identify when an imbalance of the vehicle wheel assembly has not been fully corrected by the application of the imbalance correction weights, they cannot identify the source of the error, and can only direct the operator to repeat the imbalance measurement procedures to alter the amount and placement of the imbalance correction weights. If the wheel assembly continues to slip, the operator may become caught in a repeating cycle of failed measurements, commonly referred to as "chasing weights".

Accordingly, it would be advantageous to provide a vehicle wheel balancer system with a method to evaluate a remaining imbalance present in a vehicle wheel assembly following the application of imbalance correction weights, and to determine if any remaining imbalance is the result of the vehicle wheel assembly having deviated from an expected rotational position during the time between the measurement of the imbalance and the application of the imbalance correction weights.

BRIEF SUMMARY OF THE INVENTION

Briefly stated, the present disclosure sets forth a vehicle wheel balancer system having a processing system and a spindle shaft upon which a vehicle wheel assembly is mounted for measurement of imbalance characteristics and forces. The processing system is configured with software instructions to evaluate the remaining imbalance present in a vehicle wheel assembly following the application of imbalance correction weights, and to determine if the remaining imbalance is the result of the vehicle wheel assembly having deviated from an expected rotational position during the time between the measurement of the imbalance and the application of the imbalance correction weights. In the event of such a deviation, the processing system is further configured to provide the operator with a suitable warning to evaluate and correct the mounting of the vehicle wheel assembly before proceeding to rebalance or re-measure the vehicle wheel assembly.

In an embodiment of the vehicle wheel balancer system of the present disclosure, the processing system is configured with software instructions to evaluate a distribution of remaining imbalance in a vehicle wheel assembly following the application of imbalance correction weights by comparison with a mathematical model of the vehicle wheel assembly at a plurality of different rotational positions. If the processing system can identify a correlation between the mathematical model of the vehicle wheel assembly imbalance at one of the rotational positions and the observed remaining imbalance in the vehicle wheel assembly, a warning of possible rotational slippage of the vehicle wheel assembly about the spindle axis of rotation from an expected rotational position is provided to the operator.

In an embodiment of the vehicle wheel balancer system of the present disclosure, the vehicle wheel balancer system is further configured with at least one imaging sensor having a field of view oriented to acquire images of at least a portion of the vehicle wheel assembly and balancer spindle shaft. The processing system of the vehicle wheel balancer is configure with software instructions to evaluate images received from the imaging sensor to identify deviations in the actual rotational position of either the vehicle wheel assembly or the balancer spindle shaft from an expected rotational position as reported by a rotational position sensor associated with the balancer spindle shaft. Upon identification of such deviations, a warning of possible rotational slippage of the vehicle wheel assembly about the spindle axis of rotation from an expected rotational position is provided to the operator.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The present disclosure sets forth methods for detecting, in a vehicle wheel balancer system, the occurrence of deviation between an expected wheel assembly rotational position after the application of imbalance correction weights, and the actual wheel assembly rotational position. Those of ordinary skill in the art will recognize that so long as a vehicle wheel balancer system includes a rotationally driven spindle shaft upon which a vehicle wheel assembly is mounted for imbalance measurement and correction, such as seen in FIG. 1, the specific mechanical construction of the vehicle wheel balancer system, including the spindle shaft, may vary from that which is described herein without departing from the scope of the present disclosure.

It will be further recognized that the methods of the present invention do not necessarily identify the cause of any identified deviation between an expected wheel assembly rotational position after application of imbalance correction weights and an actual wheel assembly rotational position, and that such deviations may be the result of a number of different events. For example, deviations in wheel assembly rotational position may be the result of rotational slippage between the wheel assembly and the spindle shaft upon which the wheel assembly is mounted. Such slippage can occur when an operator fails to properly secure the vehicle wheel assembly to the spindle shaft, when the attachment mechanism lacks sufficient holding force, or when a sufficiently strong external load is applied to the vehicle wheel assembly after it is mounted to spindle shaft. Similarly, a vehicle wheel assembly having a large inertial mass may slip relative to the spindle shaft axis of rotation if the spindle shaft experiences sufficiently high acceleration or decelerations. Deviations in a wheel assembly rotational position away from an expected rotational position may alternatively (or additionally) result from a change (slippage) in the rotational position of the balancer spindle shaft relative to an associated rotational position sensor disposed to monitor the spindle shaft.

Figure 2:
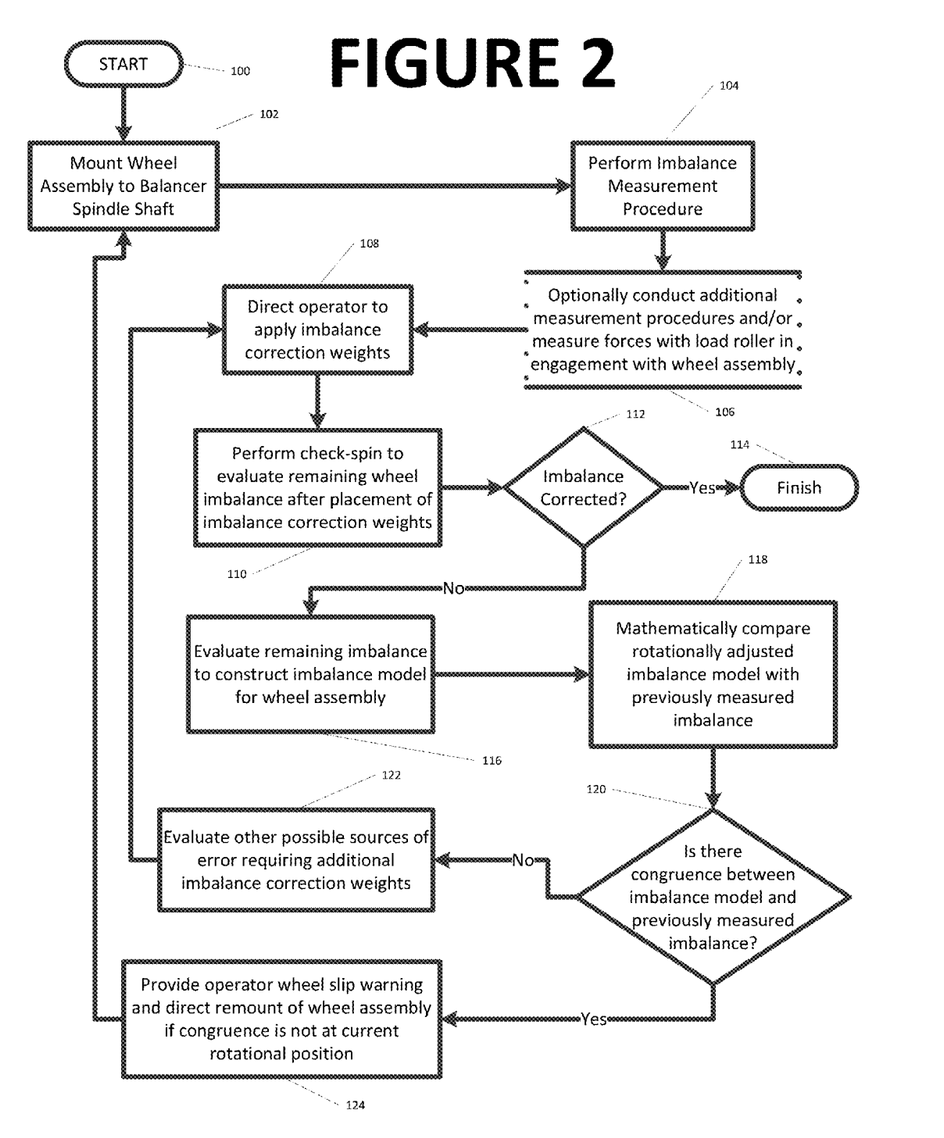
FIG. 2 is a flow chart illustrating procedural steps in a method of the present disclosure for wheel slip detection during operation for a vehicle wheel balancer.

Turning to the flow chart of FIG. 2, a method of the present disclosure for operating a vehicle wheel balancer system to detect deviation between an expected wheel assembly rotational position after application of imbalance correction weights and an actual wheel assembly rotational position (i.e., wheel slip) is shown to start at Box 100. Initially, a vehicle wheel assembly to undergo an imbalance measurement procedure is mounted to the vehicle wheel balancer spindle shaft in a conventional manner (Box 102). The vehicle wheel assembly is rotationally driven by the spindle shaft, and imbalance measurement are acquired from which a processing system of the vehicle wheel balancer can calculate required imbalance correction weight amounts and placement locations on the vehicle wheel assembly (Box 104). The measurement of the vehicle wheel assembly imbalance and calculation of imbalance correction weight amounts and placement locations is carried out in any conventional manner, for example, as is disclosed in U.S. Pat. No. 6,952,964 to Douglas, U.S. Pat. No. 7,320,248 to Douglas, and U.S. Pat. No. 7,658,108 to Douglas, each of which is herein incorporated by reference. As part of the imbalance measurement procedure, the vehicle wheel balancer system identifies the imbalance present in the vehicle wheel assembly and the relative rotational positions (or angular orientations) of the effective imbalance forces to be countered by the application of imbalance correction weights.

Following the measurement of the imbalance present in the vehicle wheel assembly, the vehicle wheel balancer system may be optionally configured to conduct additional measurements of the vehicle wheel assembly (Box 106), such as measurement of spring-rate variations about the circumference of the tire using an instrumented drum or roller engaged with the tire circumferential surface during driven rotation of the vehicle wheel assembly. Such additional measurements may be a source of slippage-type deviations in wheel assembly and/or spindle shaft rotational position.

Upon completion of the measurement steps, the vehicle wheel balancer system next directs the operator to apply calculated amounts of imbalance correction weight the vehicle wheel assembly at identified rotational positions (Box 108). The specific imbalance correction weight amounts and placement positions are selected by the vehicle wheel balancer processing system to achieve a desired level of imbalance correction for the vehicle wheel assembly, based on the imbalance measurements previously obtained, as is conventional. In addition to directing the operator as to the imbalance correction weight placement locations, the vehicle wheel balancer system may be configured to rotationally position and hold the vehicle wheel assembly at select rotational orientations to facilitate the placement of the imbalance correction weights. For example, the processing system may control the rotational position of the spindle shaft to rotate the vehicle wheel assembly to place a first imbalance correction weight placement location at the top dead center (or bottom dead center) rotational orientation. Following placement of a first imbalance correction weight, the processing system may control the rotational position of the spindle shaft to rotate the mounted vehicle wheel assembly to place any subsequent imbalance correction weight placement location at the top dead center (or bottom dead center) rotational orientation, as needed. At this point, any controlled rotation of the vehicle wheel assembly is conducted under the assumption that the mounting position of the wheel assembly has not rotationally moved relative to the indexed balancer spindle shaft since the initial imbalance measurements were acquired.

Following application of the imbalance correction weights to the vehicle wheel assembly, the vehicle wheel balancer processing system is configured to perform a check-spin procedure to evaluate any remaining or residual imbalance in the vehicle wheel assembly and to confirm that the operator has applied the correct imbalance correction weight amounts at the specified placement locations (Box 110). If the results of the check spin (Box 112) indicate that the vehicle wheel assembly has been balanced to within a desired tolerance, the process is completed (Box 114) and the vehicle wheel assembly is dismounted from the vehicle wheel balancer.

If, however, the check spin procedure identifies a remaining or residual imbalance in the vehicle wheel assembly following application of the imbalance correction weight amounts which exceeds a tolerance level, there are several possible errors which may have occurred. One of these possible errors is may result from the vehicle wheel assembly actual rotational mounting position on the balancer spindle shaft deviating from the expected rotational mounting position at some point between the time at which the imbalance was initially measured and the time at which the imbalance correction weights were applied.

In one embodiment of the present disclosure, the processing system of the vehicle wheel balancer is configured with software instructions to evaluate the remaining or residual imbalance in the vehicle wheel assembly to detect the occurrence of rotational slippage in the mounting of the vehicle wheel assembly relative to the spindle shaft (Box 116). As seen in FIG. 2, in one embodiment, the processing system may be configured to implement a method which initially evaluates the remaining imbalance to construct a virtual model of the vehicle wheel assembly imbalance. This model may represent the imbalances present in the vehicle wheel assembly for the current rotational mounting position as observed with the applied imbalance correction weights. Alternatively, the model may be constructed to represent the vehicle wheel assembly imbalance for the current rotational mounting position, prior to the application of the imbalance correction weights by the operator, by mathematically removing the effects of the applied imbalance correction weights from the observed imbalances, under the assumption that the operator has applied the correct amount of imbalance correction weight at the rotational positions identified by the balancer processing system and that any introduced error is a result of slippage.

Figure 3:
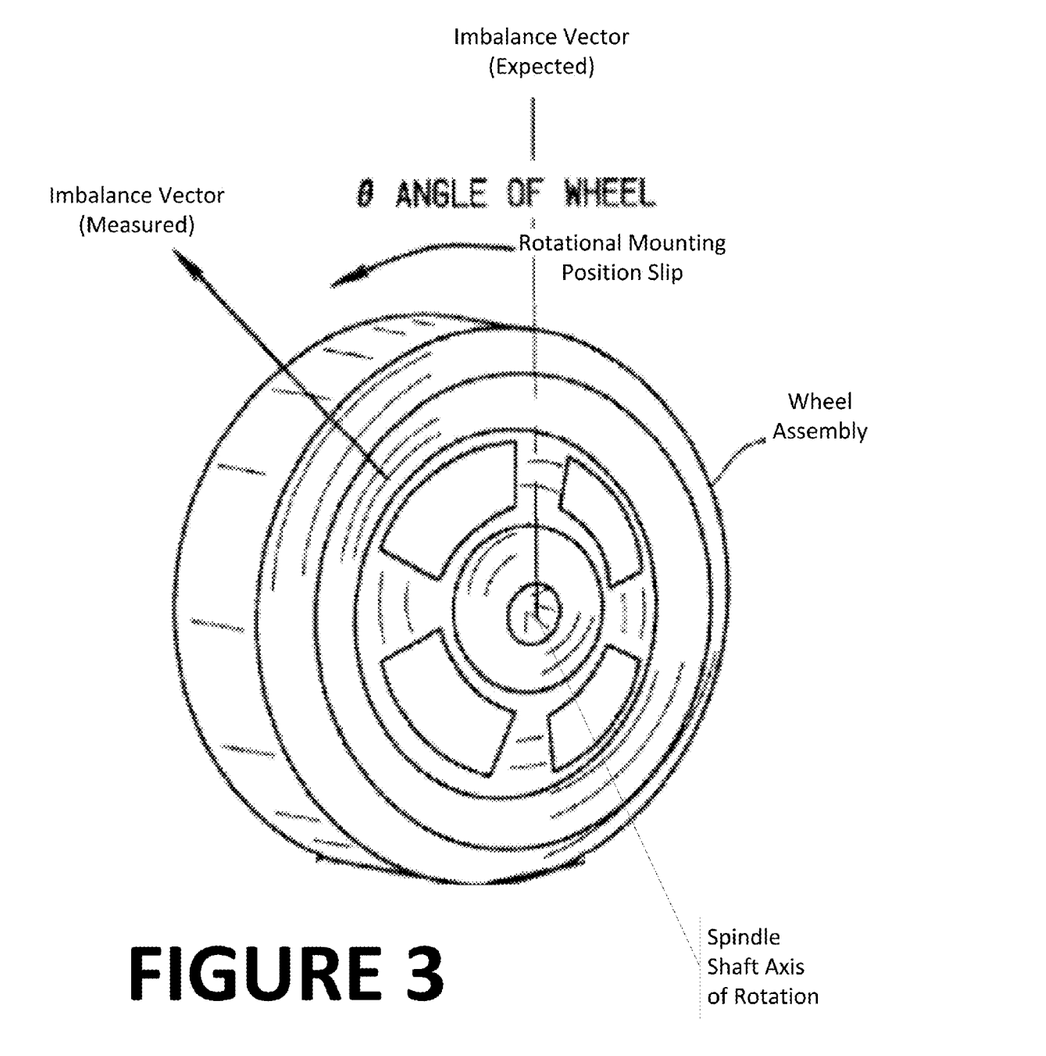
FIG. 3 is an illustration of wheel assembly rotational mounting position slip seen by comparing expected and measured residual imbalances after application of imbalance correction weights.

Once constructed, the virtual model is rotationally adjusted to a plurality of rotational positions about the axis of rotation for the vehicle wheel assembly for comparison with the originally measured imbalance of the vehicle wheel assembly as shown at Box 118 to identify a rotational position at which the model and measurements achieve congruence. Alternatively, the virtual model of the current rotational position may be compared with a representation of the originally measured imbalances combined with the imbalance correction weights applied at the current rotational position, as the originally measured imbalances are rotationally adjusted to a plurality of rotational positions about the axis of rotation for the vehicle wheel assembly to identify a rotational position at which the model and measurements achieve congruence. Regardless of the exact process utilized, the result, as illustrated in FIG. 3, is an identification of a change in the rotational mounting position of the vehicle wheel assembly on the balancer spindle shaft after an initial imbalance measurement has been acquired through an evaluation of: (a) the initial imbalance measurement at an initial rotational mounting position; (b) application of a known quantity of imbalance correction weights in a known arrangement; (c) the observed resulting imbalance in the vehicle wheel assembly at a current rotational mounting positions following application of the imbalance correction weights.

As shown at Box 118, in one embodiment, the virtual model is compared (at Box 120) with the originally measured imbalance of the vehicle wheel assembly at each rotational position to determine a measure of congruence there between. Alternatively, as shown at Box 118a in FIG. 5, actual imbalance results may be compared against a rotated model of imbalance results expected from the application of the imbalance correction weights to vehicle wheel assembly imbalances originally measured to determine a measure of congruence there between (Box 120a, FIG. 5). If no congruence is identified at any of the rotational mounting positions other than the expected rotational mounting position, the remaining imbalance in the vehicle wheel assembly is unlikely to be the result of rotational slippage of the vehicle wheel assembly relative to the balancer spindle shaft. The processing system may then evaluate other possible sources of error (Box 122), such as an application of an incorrect imbalance correction weight amount, or application of the imbalance correction weights at the wrong placement location. Suitable correction steps may be taken, including directing the operator to apply replacement or additional imbalance correction weights (return to Box 108).

Figure 4:
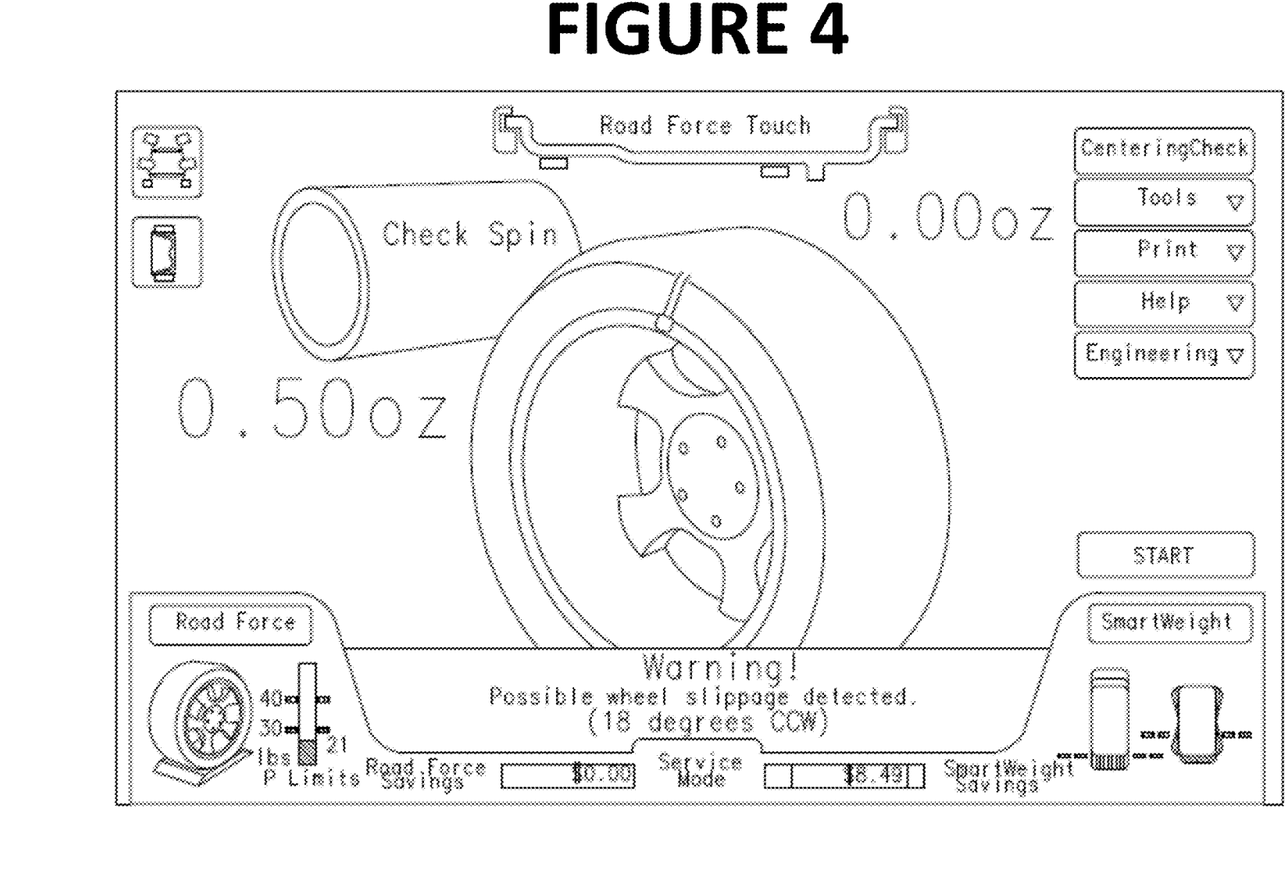
FIG. 4 is an exemplary warning screen displayed by a vehicle wheel balancer system of the present disclosure upon detection of a wheel assembly slippage condition.

If the processing system identifies a congruence at one of the rotational mounting positions which does not correspond to the expected rotational mounting position initially identified when the vehicle wheel assembly was first measured, a warning (Box 124), such as shown in FIG. 4, is provided to the operator that wheel slippage has likely occurred. This warning may optionally include information identifying the direction and amount of the rotational mounting slippage which has been detected. Preferably, the processing system is configured to direct the operator to correct the mounting of the vehicle wheel assembly to the balancer spindle shaft (return to Box 102), and to repeat the imbalance measurement and correction procedures. Alternatively, the processing system may direct other corrective steps, such as a change in the placement positions of the imbalance correction weights, or the application of additional or replacement imbalance correction weights to the vehicle wheel assembly (return to Box 108—not shown).

Figure 5:
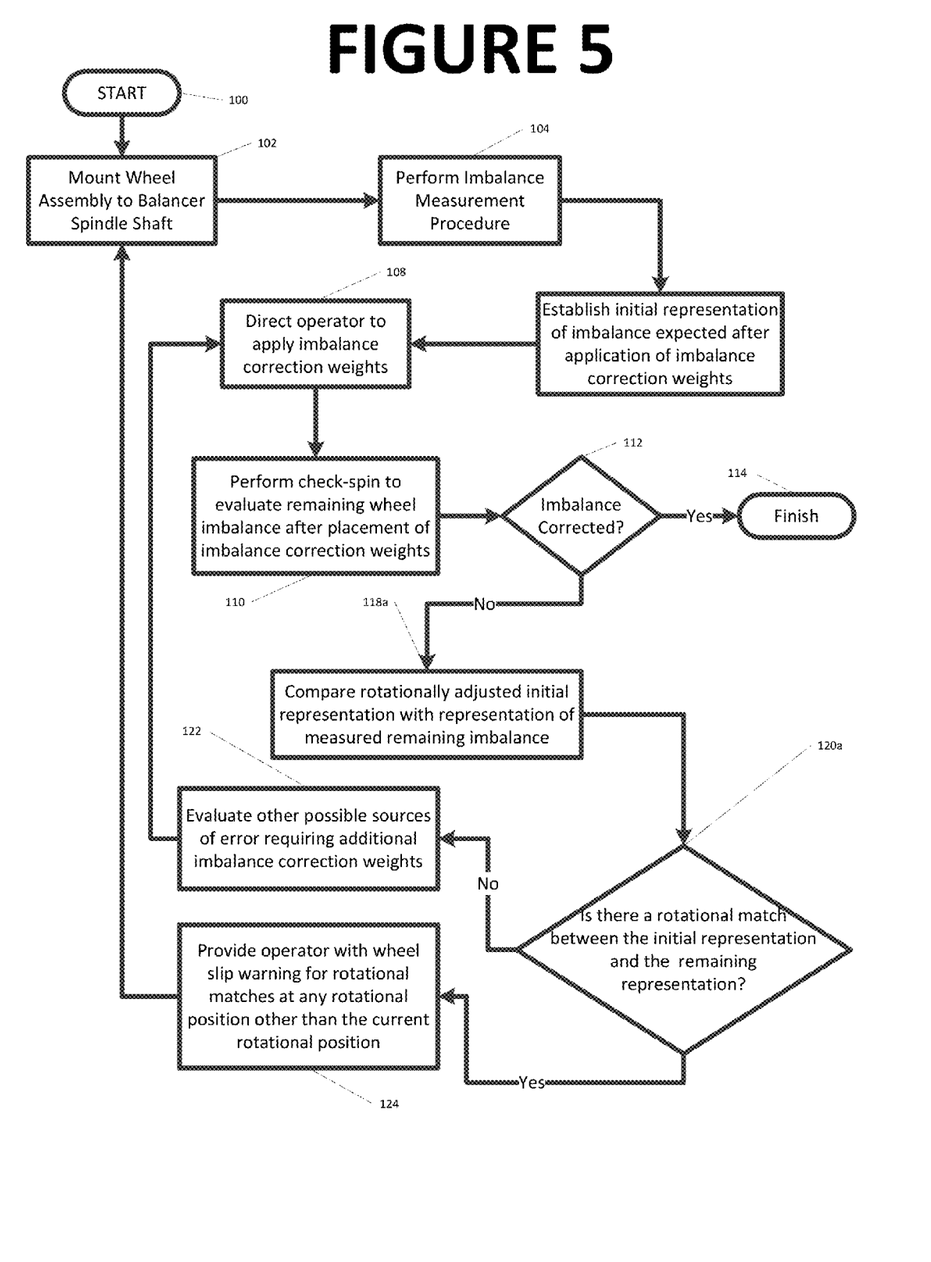
FIG. 5 is a flow chart illustrating procedural steps in an alternative method of the present disclosure for wheel slip detection operation for a vehicle wheel balancer.

By generating a model of the imbalance of the vehicle wheel assembly at the time the imbalance correction weights are applied, and comparing that model with the imbalance previously measured, (or conversely as shown in FIG. 5, modeling the expected effect of the application of imbalance correction weights to the originally measured imbalance for comparison with the observed results) the processing system of the vehicle wheel balancer system can distinguish mounting slippage of the vehicle wheel assembly from simple error in the placement of the imbalance correction weights onto the vehicle wheel assembly by the operator. If an operator inadvertently applies an imbalance correction weight to the wrong location, failing to properly correct the measured imbalance, the processing system will identify the presence of a remaining imbalance, and will proceed with the evaluation procedure set forth above. However, if the wheel assembly has not rotationally slipped or deviated from the expected rotational orientation since the initial measurements were acquired, the model of the imbalance in the vehicle wheel assembly and the originally measured imbalance will remain in rotational alignment, identifying imbalance correction weight placement (or amounts) as the likely source of the remaining imbalance.

In contrast, if rotational mounting slippage or deviation has occurred, the model of the imbalance in the vehicle wheel assembly will be found to be in congruence with the measured imbalance only at one of the rotationally adjusted model orientations. The amount of rotational adjustment required to bring the model and the measured imbalance into congruence corresponds with the amount of rotational slippage or deviation experienced by the vehicle wheel assembly between the time the model was developed by the processing system and the time the initial imbalance measurements were acquired.

A method of the present disclosure for detecting slippage in the rotational mounting position of the vehicle wheel assembly relative to the rotational axis of the balance shaft upon which it is mounted may be further illustrated by vector operations. The following vectors are defined:

$\vec{S}$init Static imbalance force due to wheel assembly initial imbalance;

$\vec{C}$init Couple imbalance force due to wheel assembly initial imbalance;

$\vec{S}$wts Static imbalance force due to weight(s) installed at their angular positions;

$\vec{C}$wts Couple imbalance force due to weight(s) installed at their angular positions;

$\vec{S}$pred Predicted residual Static imbalance force due to assembly if weight(s) were to be installed at their angular positions;

$\vec{C}$pred Predicted residual Couple imbalance force due to assembly if weight(s) were to be installed at their angular positions;

$\vec{S}$res Residual Static imbalance force after attempting to balance the wheel (applying weight(s) and performing a check spin); and $\vec{C}$res Residual Couple imbalance force after attempting to balance the wheel (applying weight(s) and performing a check spin).

The vehicle wheel balancer system is configured to compute imbalance correction weights for application to the vehicle wheel assembly which will reduce the initial static couple imbalance either completely, or partially, as described in U.S Pat. No. 6,952,964 to Gerdes et al. and U.S. Pat. No. 7,320,248 B2 to Douglas, both of which are herein incorporated by reference.

Predicted residual static and couple imbalance forces are also utilized:

$$\vec{S}\text{pred}=\vec{S}\text{init}+\vec{S}wts$$

$$\vec{C}\text{pred}=\vec{C}\text{init}+\vec{C}wts$$

The predicted imbalance forces could be at zero, or near zero, if the vehicle wheel balancer system computes imbalance correction weights to remove all of the measured imbalance forces, as limited by the incremental sizes of available imbalance correction weights. Alternatively, the predicted imbalance forces could be substantially non-zero if the vehicle wheel balancer system is configured to intentionally leave a residual imbalance force as described in the '964 and '248 patents. A vehicle wheel balancer system of the present disclosure may be configured to estimate the residual imbalance forces as if the mounting of the wheel assembly slips by an angle θ after the assembly imbalance is measured and before the application of any imbalance correction weights. In other words, the system may be configured to detect if the mounting of the wheel assembly at the time of the initial imbalance measurement has shifted between that point in time and the point in time at which the imbalance correction weights were applied.

$$\vec{S}\text{pred}=\vec{S}\text{init}<<\theta+\vec{S}wts$$

$$\vec{C}\text{pred}=\vec{C}\text{init}<<\theta+\vec{C}wts$$

After the imbalance correction weights are applied to the vehicle wheel assembly at the identified locations, and a check spin is performed, a set of values for $\vec{S}$pred and $\vec{C}$pred are computed using incremental values for $\theta$ corresponding to all possible mounting slip angles of interest. For example, $\theta$ may be incremented in 1 degree increments about a full 360 degrees of rotation. Alternatively, coarser increments of $\theta$ may be utilized to reduce computation time, while finer increments of $\theta$ may be utilized to achieve a greater degree of accuracy in the identification of an amount of detected slip. It should be noted that by using a fine increment for $\theta$ such as 1 degree or less, it is possible to detect wheel assembly mounting slip for a small grouping of adjacent values of $\theta$. Under these condition, the value of $\theta$ which yields the smallest difference in the comparison is considered to be the effective slip angle.

If the predicted couple and static forces agree with the residual couple and static forces within predetermined thresholds for any of the non-zero values of $\theta$ evaluated, the vehicle wheel balancer system is configured to identify the presence of wheel assembly rotational mounting position slip (a zero value of $\theta$ is the expected result if there is no slippage present).

Optionally, the vehicle wheel balancer system may be configured with various limitations associated with the slip detection procedures to ensure that false nuisance detections of slippage do not occur:

Ignoring slip detection if the previous spin did not display imbalance correction weights;

Ignoring slip detection if the check-spin doesn't show any applied imbalance correction weights;

Ignoring slip detection if the slip angle $\theta$ detected is less than an acceptable tolerance, such as 11.0 degrees;

Ignoring slip detection if the wheel assembly was intentionally changed after the initial measurements were acquired, for example, if a different wheel was mounted for the check spin; and Ignoring slip detection if the predicted couple and static forces agree with the residual couple and static forces within predetermined thresholds at more than one discrete slip angle $\theta$.

It is also noteworthy to mention that slip detection could also be accomplished by basing the computations on balance weight amounts and angles. Similar vector math and comparisons could be implemented for predictions of residual weight amounts and placement angles using various $\theta$ angles of wheel slip vs. the chase-spin residual weight(s) amount and placement angle.

An additional or alternate source of apparent rotational slippage of the vehicle wheel assembly is present when the spindle shaft itself rotationally slips relative to the measurement instrument utilized by the vehicle wheel balancer to monitor rotational movement of the spindle shaft. This slippage may be actual physical slippage, or may be virtual slippage caused by a failure of the sensor to register some degree of rotational movement. Such a spindle shaft rotational slippage will have the same effect on a remaining imbalance in the vehicle wheel assembly after application of imbalance correction weights as would rotational slippage of the vehicle wheel assembly relative to the spindle shaft itself. A balancer processing system configured to mathematically model the imbalance in a wheel assembly for comparison with an initial imbalance measurement will identify an occurrence of rotational slippage or deviation between the time of measurement and the time of imbalance correction weight application, but cannot distinguish between slippage of the spindle shaft and slippage of the wheel assembly.

Figure 6:
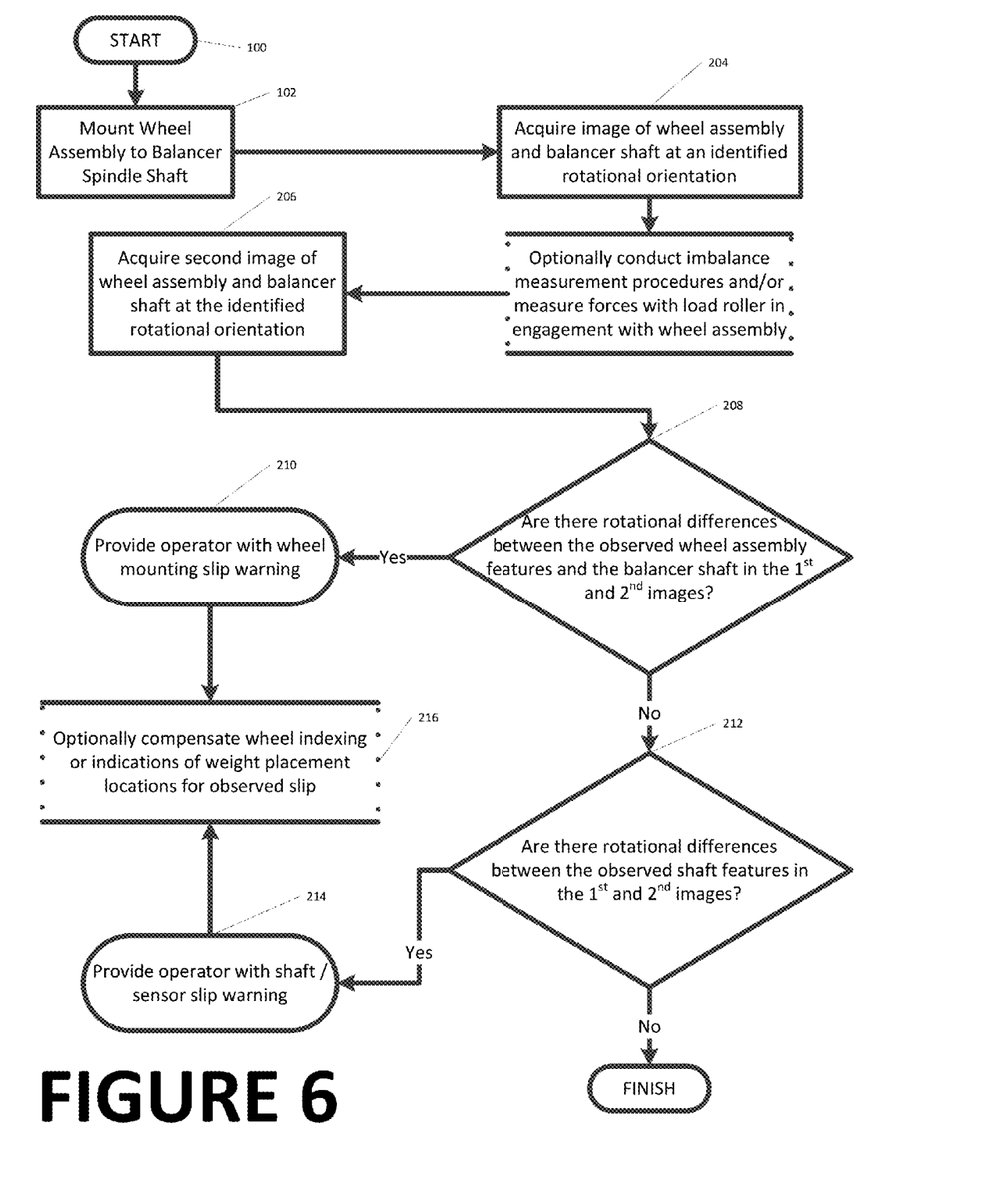
FIG. 6 is a flow chart illustrating procedural steps in an alternate method of the present disclosure for wheel slip detection on a vehicle wheel balancer using optical imaging.

In order to distinguish between rotational slippage of the spindle shaft/sensor, and rotational slippage of the vehicle wheel assembly/spindle shaft, an additional reference point and measurement system is required. For example, a vehicle wheel balancer may be configured with an optical imaging system (not shown) having a field of view which encompasses at least a portion of the vehicle wheel assembly surface and a portion of the spindle shaft when the wheel assembly is mounted there upon. A typical imaging system will include at least one optical sensor for generating images, and a suitably configured processor for receiving and analyzing the generated images to identify features of interest or other relevant data. FIG. 6 illustrates an exemplary method of the present disclosure for wheel assembly rotational mounting slip detection utilizing an imaging system associated with a vehicle wheel balancer. Once a wheel assembly is mounted to the balancer spindle shaft, (Box 102), images acquired by the optical imaging system (Box 204) are processed (either by the balancer processing system or a dedicated image sub-processing system) to identify unique features on the observed wheel assembly and spindle surfaces. These features may be random observable points, or may be specific structures or targets. With conventional image processing techniques, such as shown in U.S. Pat. No. 6,894,771 B1 to Dorrance et al., an image acquired at the time of the initial imbalance measurements (Box 204) can be compared (Box 208) with an image acquired at a subsequent point in time (Box 206) to identify the presence of any rotational shift between the vehicle wheel assembly and the spindle shaft (Box 210). In addition, if the spindle shaft is rotationally positioned in the same rotational position in each image, as reported by the associated shaft position sensor, a comparison can be made (Box 212) with the observed positions of the identified features on the spindle shaft to identify the presence of any rotational shift between the spindle shaft reported rotational position (from the shaft position sensor) and the actual observed spindle shaft rotational position (Box 214).

By utilizing an optical imaging system to detect and measure slip of the rotational mounting position of a wheel assembly on the balancer shaft occurring after an initial imbalance measurement, but before the placement of imbalance correction weights, it becomes possible for a suitably programmed vehicle wheel balancing system to automatically compensate for the detected and measured slippage when directing the operator to apply imbalance correction weights (Box 216). Upon the detection of wheel mounting slippage, the vehicle wheel balancing system may be configured to provide the operator with a suitable warning and/or adjust calculated imbalance correction weight placement locations by an offset amount which corresponds to the measured amount of slip. Effectively, the vehicle wheel balancing system may be configured to proceed with the imbalance measurements as if the initial imbalance measurements were acquired with the vehicle wheel assembly at the new (i.e. slipped) rotational position. By automatically adjusting the imbalance correction weight placement locations, the vehicle wheel balancer system enables the operator to complete the imbalance correction procedure without the need to alter the wheel assembly mounting and/or repeat imbalance measurement procedures.

As one embodiment, the present disclosure sets forth a method for detection of deviation in a vehicle wheel assembly rotational mounting position about an axis of rotation of a wheel balancer spindle shaft during an imbalance correction procedure, comprising: mounting the vehicle wheel assembly to the balancer spindle shaft; rotationally driving the balancer spindle shaft during a first imbalance measurement procedure to acquire measurements of imbalance associated with the vehicle wheel assembly in a first rotational mounting position, said measurements indexed to said first rotational mounting position; optionally conducting at least one subsequent measurement procedure associated with said vehicle wheel assembly while mounted to said balancer spindle shaft; identifying at least one imbalance correction weight amount and placement location for application to said vehicle wheel assembly, utilizing said acquired measurements of imbalance; applying said identified imbalance correction weights to said vehicle wheel assembly; rotationally driving the balancer spindle shaft during a second imbalance measurement procedure to acquire measurements of remaining imbalance associated with the vehicle wheel assembly; responsive to said measured remaining imbalance exceeding a tolerance, establishing an imbalance model representative of said vehicle wheel assembly, said imbalance model indexed to a current rotational mounting position of the vehicle wheel assembly relative to said spindle shaft; comparing said imbalance model with said first acquired measurements of imbalance to identify a rotational mounting position relative to said spindle shaft at which said imbalance model and said first acquired measurements are congruent; and responsive to an identification of said rotational mounting position of congruence deviating from the current rotational mounting position of the vehicle wheel assembly relative to said shaft, providing a warning of rotational deviation associated with said vehicle wheel assembly and said balancer spindle shaft.

In another embodiment, the present disclosure sets forth a method for the detection of rotational mounting position deviation about an axis of rotation associated with a vehicle wheel assembly and wheel balancer spindle shaft during an imbalance correction procedure, comprising: acquiring an initial image of at least a portion of said vehicle wheel assembly and said wheel balancer spindle shaft; processing said acquired image to identifying one or more discrete points on said vehicle wheel assembly and one or more discrete points on said balancer spindle shaft, wherein relative positions of said discrete points identifying a first relative rotational mounting position of said vehicle wheel assembly on said balancer spindle shaft; subsequently acquiring a second image of said portion of said vehicle wheel assembly and said wheel balancer spindle shaft; processing said acquired second image to identifying said at least one discrete point on said vehicle wheel assembly and said at least one discrete point on said balancer spindle shaft, wherein relative positions of said discrete points in said second image identifying a second relative rotational mounting position of said vehicle wheel assembly on said balancer spindle shaft; and comparing said first and second relative rotational mounting positions to detect rotational mounting position deviation between said vehicle wheel assembly and said balancer spindle shaft about said axis of rotation.

In another embodiment, the present disclosure sets forth a method for detecting a deviation in a vehicle wheel assembly rotational mounting position about an axis of rotation of a wheel balancer spindle shaft during an imbalance correction procedure, comprising: acquiring initial measurements of imbalance associated with the vehicle wheel assembly in a first rotational mounting position on said wheel balancer spindle shaft; identifying at least one imbalance correction weight amount and placement location for application to said vehicle wheel assembly, utilizing said acquired initial measurements; applying said identified imbalance correction weights to said vehicle wheel assembly; rotationally driving the balancer spindle shaft during a second imbalance measurement procedure to acquire measurements of remaining imbalance associated with the vehicle wheel assembly; responsive to said measured remaining imbalance exceeding a tolerance, utilizing said acquired initial measurements, said identified at least one imbalance correction weight amount and placement location, and said remaining imbalance to detect and measure an amount of rotational mounting position slippage having occurred between said acquisition of said initial measurements and said acquisition of said remaining imbalance measurements.

In a further embodiment, the present disclosure sets forth a method for the detection of rotational mounting position deviation about an axis of rotation associated with a vehicle wheel assembly and wheel balancer spindle shaft during an imbalance correction procedure, comprising: acquiring an initial image of at least a portion of said vehicle wheel assembly, said initial image associated with a first rotational position identified by a rotational position sensor associated with said balancer spindle shaft; processing said acquired image to identifying one or more discrete points on said vehicle wheel assembly, wherein relative positions of said discrete points identify a first relative rotational mounting position of said vehicle wheel assembly associated with said first rotational position; subsequently acquiring a second image of said portion of said vehicle wheel assembly, said second image associated with a second rotational position identified by said rotational position sensor after a rotational movement of the vehicle wheel assembly; processing said acquired second image to identifying said one or more discrete points on said vehicle wheel assembly, wherein relative positions of said discrete points in said second image identify a second relative rotational mounting position of said vehicle wheel assembly associated with said second rotational position; comparing a representation of rotation between said first and second relative rotational mounting positions with a representation of rotation between said first and second rotational positions identified by said rotational position sensor to detect a difference, said difference indicating the presence of a rotational deviation about said axis of rotation between at least one of said vehicle wheel assembly and said balancer spindle shaft, or between said balancer spindle shaft and said associated rotational position sensor.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An improved vehicle wheel balancer system having a balancer spindle shaft on which a vehicle wheel assembly is mounted for rotational movement and a processing system configured with software instructions to conduct at least an imbalance measurement procedure to identify at least one imbalance correction weight amount and placement location for application to said vehicle wheel assembly, the improvement comprising:

said processing system being further configured with software instructions to detect a rotational mounting position deviation associated with said vehicle wheel assembly about an axis of said balancer spindle shaft occurring between an initial measurement of vehicle wheel assembly imbalance and a subsequent measurement of the vehicle wheel assembly imbalance following application of said at least one imbalance correction weight to the vehicle wheel assembly;

wherein said vehicle wheel assembly is not remounted on said balancer spindle shaft between said initial measurement and said subsequent measurement.

2. The improved vehicle wheel balancer system of claim 1 wherein said processing system is configured with software instructions to generate a model of imbalance associated with said vehicle wheel assembly from said initial measurement of vehicle wheel assembly imbalance.

3. The improved vehicle wheel balancer system of claim 2 wherein said model of imbalance is a representation of said vehicle wheel assembly imbalance following an application of imbalance correction weights, and is indexed to an expected rotational mounting position of said vehicle wheel assembly relative to said balancer spindle shaft.

4. The improved vehicle wheel balancer system of claim 2 wherein said processing system is further configured with software instructions to compare said model at a plurality of relative rotational mounting positions of said vehicle wheel assembly about an axis of said balancer spindle shaft with said subsequent measurement of said vehicle wheel assembly imbalance to identify a congruence therebetween.

5. The improved vehicle wheel balancer system of claim 1 wherein said rotational mounting position deviation represents rotational slippage of the mounting of said vehicle wheel assembly about said balancer spindle shaft axis, relative to said balancer spindle shaft.

6. The improved vehicle wheel balancer system of claim 1 wherein said rotational mounting position deviation represents rotational slippage of said balancer spindle shaft relative to an associated rotational position sensor.

7. An improved vehicle wheel balancer having a balancer spindle shaft on which a vehicle wheel assembly is mounted for rotational movement, a drive system coupled to said balancer spindle shaft, a display device, and a processing system configured to control said drive system and said display device, the improvement comprising:

wherein said processing system is configured with software instructions to measure an imbalance in the vehicle wheel assembly mounted to said balancer spindle shaft and to identify at least one imbalance correction weight amount and placement location on said vehicle wheel assembly required to correct a measured imbalance to within an acceptable tolerance;

wherein said processing system is further configured with software instructions to check for rotational slip of the vehicle wheel assembly about an axis of said balancer spindle shaft by:

(a) establishing a representation of an imbalance condition in the vehicle wheel assembly which is expected to be present following an application of said identified at least one imbalance correction weight to the vehicle wheel assembly;

(b) re-measuring the imbalance in the vehicle wheel assembly following an application of said at least one imbalance correction weight to the vehicle wheel assembly; and (c) responsive to said re-measured imbalance failing to meet said acceptable tolerance, comparing said representation of said expected imbalance condition with said re-measured imbalance condition to determine if rotationally changing said expected imbalance condition results in a match with said re-measured imbalance, wherein said match indicates an occurrence of rotational slip of the vehicle wheel assembly relative to said balancer spindle shaft, about said axis of said balancer spindle shaft.

8. The improved vehicle wheel balancer system of claim 7 wherein said representation of said expected imbalance condition is a model of imbalance expected to be associated with said vehicle wheel assembly at an initial rotational orientation relative to said balancer spindle shaft following said application of said at least one imbalance correction weight.

9. The improved vehicle wheel balancer system of claim 8 wherein said processing system is configured with software instructions to alter, at least once, said rotational orientation of said model of imbalance about said axis of said balancer spindle shaft for comparison with said re-measured imbalance condition of said vehicle wheel assembly.

10. A method for operating a vehicle wheel balancer having a balancer spindle shaft on which a vehicle wheel assembly is mounted for rotational movement, and a processing system configured with software instructions to conduct at least an imbalance measurement procedure to identify at least one imbalance correction weight amount and placement location for application to said vehicle wheel assembly, comprising:

establishing a representation of an expected imbalance condition in the vehicle wheel assembly which is expected to be present following an application of said identified at least one imbalance correction weight to the vehicle wheel assembly;

re-measuring the imbalance in the vehicle wheel assembly following an application of said at least one imbalance correction weight to the vehicle wheel assembly;

responsive to said measured imbalance failing to meet an acceptable tolerance, comparing said representation of said expected imbalance condition with said re-measured imbalance condition to determine if rotationally changing said expected imbalance condition results in a match with said measured imbalance; and wherein a presence of said match indicates an occurrence of rotational slip of the vehicle wheel assembly relative to said balancer spindle shaft about said axis of said balancer spindle shaft.

11. The method of claim 10 where said step of comparing identifies a change in a rotational position of the vehicle wheel assembly about said axis of said balancer spindle shaft, required to match said expected imbalance condition with said re-measured imbalance condition, said identified change in said rotational position corresponding to a measure of rotational slip of the vehicle wheel assembly about said axis of said balancer spindle shaft.

\* \* \* \* \*